(12) United States Patent
Guettier (10) Patent No.: US 10,165,468 B2
(45) Date of Patent: Dec. 25, 2018

(54) METHOD FOR AUTHORISING TRANSMISSION REQUESTS

(71) Applicant: SAFRAN ELECTRONICS & DEFENSE SAS, Boulogne Billancourt (FR)

(72) Inventor: Christophe Guettier, Boulogne Billancourt (FR)

(73) Assignee: SAFRAN ELECTRONICS & DEFENSE SAS, Boulogne Billancourt (FR)

( * ) Notice: Subject to any disclaimer, the term of this patent is extended or adjusted under 35 U.S.C. 154(b) by 0 days.

(21) Appl. No.: 15/515,793

(22) PCT Filed: Oct. 6, 2015

(86) PCT No.: PCT/EP2015/072975
§ 371 (c)(1),
(2) Date: Mar. 30, 2017

(87) PCT Pub. No.: WO2016/055433
PCT Pub. Date: Apr. 14, 2016

(65) Prior Publication Data
US 2018/0077607 A1 Mar. 15, 2018

(30) Foreign Application Priority Data
Oct. 7, 2014 (FR) ..................... 14 59603

(51) Int. Cl.
*H04W 36/16* (2009.01)
*H04W 28/10* (2009.01)
(Continued)

(52) U.S. Cl.
CPC ............. *H04W 28/10* (2013.01); *H04L 45/02* (2013.01); *H04L 45/12* (2013.01); *H04L 69/24* (2013.01);
(Continued)

(58) Field of Classification Search
None
See application file for complete search history.

(56) References Cited

U.S. PATENT DOCUMENTS

| 7,069,320 B1* | 6/2006 | Chang ................. H04L 41/0816 370/452 |
| 2009/0122748 A1 | 5/2009 | Gourhant et al. |
| 2013/0039207 A1* | 2/2013 | Vadasz ................ H04L 12/5601 370/252 |

OTHER PUBLICATIONS

Dec. 8, 2015 Search Report issued in International Patent Application No. PCT/EP2015/072975.
(Continued)

*Primary Examiner* — Christine T Duong
(74) *Attorney, Agent, or Firm* — Oliff PLC (57) ABSTRACT

A method for maximizing a quantity of enabled transmission requests from a set of transmission requests in a mobile wireless network comprising a plurality of mobile nodes. Said method is implemented by a master node and activated on reception by the master node of an event belonging to a predefined set of events comprising a first type of event involving a modification to the topology of the network. The method comprises: obtaining a set of transmission demands; if the event is of the first type, implementing an optimization procedure comprising: defining transmission rate and latency constraints; defining at least one subset of the set of transmission requests; associating each subset defined with a cost function; determining a subset of maximum-cardinality compatible with said constraints and minimizing the cost function, said subset representing the transmission requests to be enabled.

12 Claims, 7 Drawing Sheets

(51) Int. Cl.
  *H04L 12/751*   (2013.01)
  *H04L 29/06*    (2006.01)
  *H04L 12/721*   (2013.01)
  *H04W 28/02*    (2009.01)
  *H04W 40/24*    (2009.01)
  *H04W 84/18*    (2009.01)

(52) U.S. Cl.
  CPC ...... *H04W 28/0252* (2013.01); *H04W 40/248* (2013.01); *H04W 84/18* (2013.01)

(56) References Cited

OTHER PUBLICATIONS

Guettier et al; "Automatic Optimisation of Reliable Collaborative Services in OLSR Mobile Ad Hoc Networks;" Military Communications Conference, 2007; Oct. 29, 2007; pp. 1-7.

Guenane et al; "Solving virtual network resource allocation problems using a Constraint Satisfaction Problem model;" 2013 Fourth International Conference on the Network of the Future; Oct. 23, 2013; pp. 1-5.

Juilan et al; "QoS and Fairness Constrained Convex Optimization of Resource Allocation for Wireless Cellular and Ad Hoc Networks;" Proceedings IEEE Infocom 2002; The Conference on computer Communications; 21st Annual Joint Conference of the IEEE Computer and Communications Societeis; Jun. 23-27, 2002; pp. 477-486.

\* cited by examiner

METHOD FOR AUTHORISING TRANSMISSION REQUESTS

The present invention relates to a method for maximising a quantity of active transmissions in a wireless mobile network.

The invention is in the field of communications on wireless networks. The invention is in particular suited to networks of the ad-hoc network type without infrastructure, comprising mobile nodes such as networks of the MANET type ("Mobile Ad-hoc NETwork"). Each node is implemented in the form of a wireless communication device. In an Mobile Ad-hoc NETwork, each node in the network is connected to other nodes in the network by a set of internode links, this set being able to vary over time. The links are established automatically by means of a mobile network communication protocol, for example of the LSR ("link state routing") type. The present invention therefore applies to derivatives of LSR networks, that is to say networks using the OSPF ("open shortest path first") standard and optimised versions of the OSPF standard, such as OLSR ("optimised link state routing") or MARP ("mobility aware routing protocol"). Each link has limited capacities, also variable over time, such as for example a bandwidth or a transmission latency. The links and nodes form a communication graph (also referred to as a topology) that is variable over time. Hereinafter network capacities will be spoken of to encompass the capacities of all the links constituting a network.

A Mobile ad-hoc network can support a large number of applications. In a data exchange application envisaged in the context of the invention, each node is also an optronic sensor capable of acquiring data and in particular data of the image, video and/or audio type. The data thus acquired are exchanged between the nodes in the network following transmission requests issued either by a source mode or by one or more destination nodes. According to the number of destinations, the transmissions can be done in unicast mode or in multicast mode.

To avoid phenomena of congestion or loss of data in the network, it is necessary in general to ensure the compatibility of the characteristics of a data traffic caused by a transmission with the capacities of a network. Among the characteristics most often considered, there are a traffic rate, a latency required for this traffic and sometimes a relative priority level of this traffic with respect to other competing traffics. The priority level of a traffic, also referred to as the criticality level, usually represents the level of importance of this traffic. It will be considered hereinafter that the most critical traffic must be transmitted.

The implementation of a data exchange application in an ad-hoc mobile network poses a certain number of problems and in particular a problem of management of transmission requests. This is because the mobile character of the nodes in the network gives rise to constant variations in its topology. The capacity of the links connecting two nodes may consequently vary over time. In addition, new nodes may appear whereas others may disappear, which causes creations and disappearances of links. It thus appears necessary to constantly take into account these changes in topology in the management of transmission requests, but also in the management of current transmissions.

The aim of the invention is to maximise the number of active transmissions in the ad-hoc mobile network considered at a given instant. An active transmission is here defined as a current transmission, having previously being the subject of a transmission request, this request having been authorised by a transmission request management system. An authorised transmission request is therefore made concrete by an active transmission. In contradiction, a waiting transmission request is a request that has not been authorised by the transmission request management system, this request having been put in a queue in order to be able to be considered later by the system. It may prove to be lapsed if it can no longer be honoured by the network. This may be the case following an action by an operator or after expiry of a maximum admissible time (time-out). We shall see hereinafter that resolving this global problem amounts to solving more-targeted problems dependent on the context, such as for example verification of the compatibility of the traffic associated with a transmission request with the capacity of a network, or the updating of current transmissions in the case of a change in topology.

The invention relates to a method for maximising a quantity of authorised transmission requests among a set of transmission requests in a mobile wireless network comprising a plurality of mobile nodes connected by links, each link being associated with capacities comprising a bandwidth and a latency, each transmission having to take place on a transmission path and being associated with characteristics comprising a maximum allowable transmission rate and latency, said method being implemented by a master node and being characterised in that it is activated on reception by the master node of an event belonging to a predefined set of events, the predefined set of events comprising a first type of event involving a change in topology of the network, and in that it comprises the following steps: obtaining a set of transmission requests; if the event is of the first type, implementing a constrained optimisation procedure comprising the following steps: defining constraints comprising transmission rate and latency constraints according to the capacities of each link involved in each transmission path adopted for each transmission request in the set of transmission requests; defining at least one subset of the set of transmission requests; associating each subset defined with a cost function, the cost function associated with a subset taking into account the transmission paths adopted for the respective transmission requests included in the subset; determining a subset of maximum-cardinality compatible with the constraints defined and minimising the cost function, the subset determined representing the transmission requests to be authorised.

In this way, the method ensures that the number of transmission requests is maximised and uses the capacities of the mobile wireless network to the maximum.

According to one embodiment, the predefined set comprises a second type of event not involving any modification to the topology of the network, the determination of the subset of maximum-cardinality compatible with the constraints defined in the context of an event of the second type uses a simplified procedure for determining the transmission requests to be authorised, the implementation of the constrained optimisation procedure being dependent on the result of the simplified procedure for determining the transmission requests to be authorised.

In this way, the choice of the transmission requests to be authorised is simplified.

According to one embodiment, the characteristics of a transmission request also comprise a criticality level making it possible to sequence the processing of the transmission requests with respect to one another, the respective criticality levels of the transmission requests of a given subset being taken into account by the method in the form of a supplementary constraint making it possible to ensure that the subset determined comprises the transmission requests of all the transmission requests associated with the highest criticality levels.

In this way, the most important communication requests are favoured.

According to one embodiment, each transmission path adopted for a transmission request belonging to a given subset of transmission requests is associated with a cost dependent on a quantity of nodes through which the transmission path passes, the cost function of a given subset of transmission requests being the sum of the costs associated with the transmission paths adopted for each transmission request included in the given subset of transmission requests.

According to one embodiment, the constrained optimisation procedure comprises a search for optimum transmission paths for each transmission request.

According to one embodiment, all the transmission requests comprise authorised requests associated with current transmissions and waiting requests.

According to one embodiment, each node in the network comprises an optronic sensor capable of acquiring information comprising data of the image and video type, the transmissions used by the method being transmissions of this information.

According to one embodiment, the first type of event corresponds to events relating to: a modification of at least one characteristic of a link in the network; or an appearance of a new node in the network.

According to one embodiment, the second type of event corresponds to events relating to: reception of a new transmission request from a source node or from a destination node without change to the topology of the network; or an end of active transmission without any change to the topology of the network.

According to one embodiment, the subset determined is the subset of maximum-cardinality compatible with all the constraints defined and minimising the cost function at a moment when the constrained optimisation procedure stops.

According to a second aspect of the present invention, the present invention relates to a communication device able to maximise a quantity of authorised transmission requests among a set of transmission requests in a mobile wireless network comprising a plurality of communication devices connected by links, each link being associated with capacities comprising a bandwidth and a latency, each transmission having to take place on a transmission path and being associated with characteristics comprising a maximum allowable rate and latency, said device being characterised in that it comprises: means for receiving events; means for determining a type of event received in a predefined set of events, the predefined set of events comprising a first type of event involving a change to the topology of the network; means for obtaining a set of transmission requests; and constrained optimisation means comprising: means for defining constraints comprising rate and latency constraints according to the capacities of each link involved in each transmission path adopted for each transmission request in the set of transmission requests obtained; means for defining subsets of the set of transmission requests obtained; means for associating each subset defined with a cost function, the cost function associated with a subset taking into account the transmission paths adopted for the respective transmission requests included in the subset; and means for determining, among the subsets defined, a subset of maximum-cardinality compatible with the constraints defined and minimising the associated cost function, the subset determined representing the transmission requests to be authorised.

According to a third aspect of the present invention, the present invention relates to a communication system comprising a plurality of mobile communication devices communicating in a wireless communication mode, and comprising a communication device according to the second aspect.

According to a fourth aspect of the present invention, the present invention relates to a computer program product containing instructions for the implementation, by a device, of the method according to the first aspect by a processor of the device.

According to a fifth aspect of the present invention, the present invention relates to storage means storing a computer program containing instructions for the implementation, by a device, of the method according the first aspect when said program is executed by a processor of the device.

The features of the invention mentioned above, as well as others, will emerge more clearly from a reading of the following description of an example embodiment, said description being given in relation to the accompanying drawings, among which.

Figure 8:
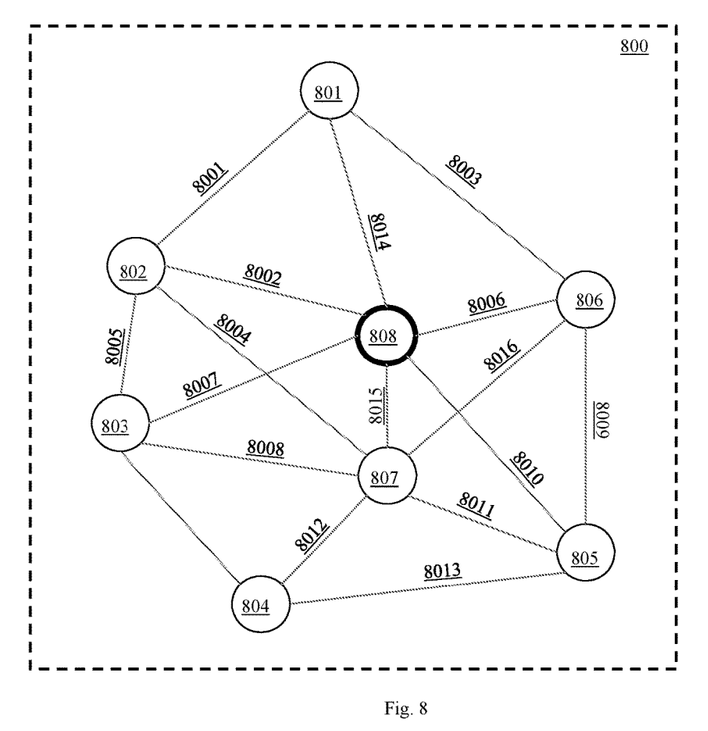
FIG. 8 illustrates an example of an ad-hoc mobile network.

The invention is implemented in a network of the Mobile ad-hoc network type and is particularly advantageous in a meshed Mobile ad-hoc network, an example of which is shown by FIG. 8. FIG. 8 shows a meshed Mobile ad-hoc network 800 comprising eight mobile nodes, numbered 801 to 808 in FIG. 8. As seen above, each node comprises wireless communication means and data acquisition means such as for example an optronic sensor. The nodes are connected together by wireless links, numbered 8001 to 8016 in FIG. 8. The number of links and the characteristics thereof, such as the bandwidth and latency thereof, are variable over time. Traffic caused by a transmission between a source node and a receiving node follows a certain number of links that form together a transmission path. The transmission path between two nodes followed by the traffic is usually determined by a routing algorithm of the LSR type. As can be seen in FIG. 8, a transmission between a source node and a destination node may follow a plurality of transmission paths. It is then necessary to choose among the possible transmission paths an optimum transmission path in accordance with a given criterion, such as for example the number of nodes passed through that is to be minimised. Among the nodes of the network, a particular node is provided for managing synchronisation of the clocks of all the nodes and implementing a method for managing transmission requests according to the invention. This node, which we shall call the "master node" hereinafter, and numbered 808 in FIG. 8, can be defined by a user on initialisation of the network.

Figure 1:
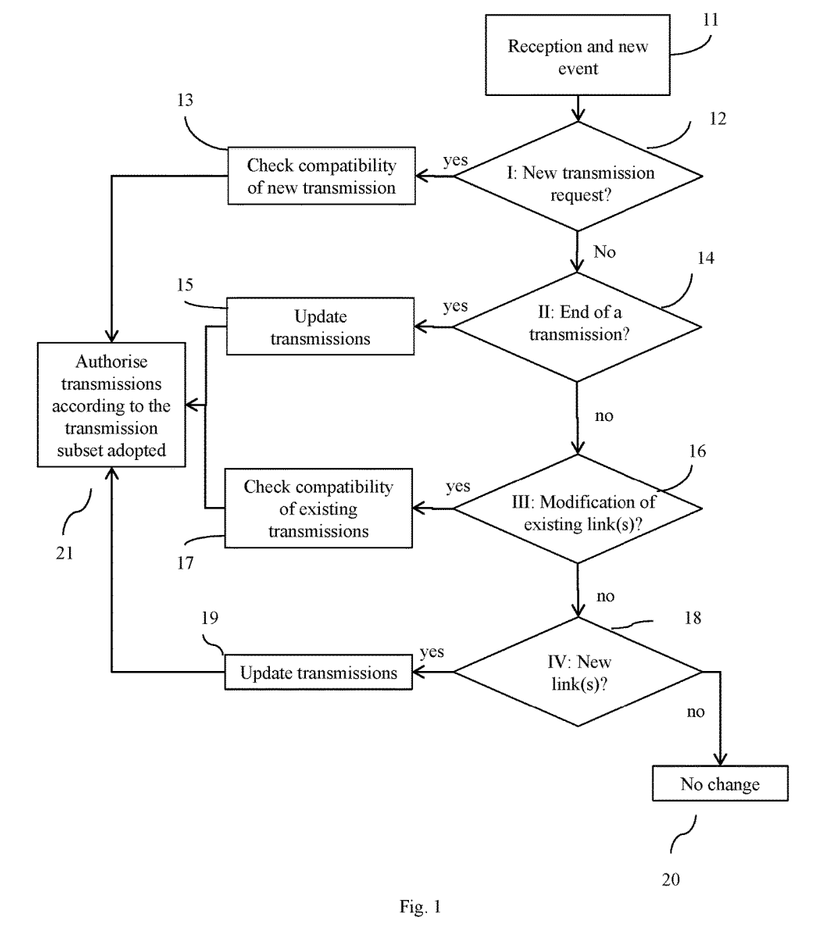
FIG. 1 shows in diagram form the principle of an algorithm for managing the transmission requests suited to a data exchange application in an ad-hoc mobile network.

An algorithm for managing transmission requests according to the invention is illustrated in FIG. 1. This algorithm is implemented by the master node of the network. The transmission request management algorithm may be launched in a step 11 when an event is received by the master node.

In the context of the invention, an event may be of several types. The first two types of event envisaged do not cause any change to the topology of the network.

I. The first is the reception of one of more new transmission requests made either by a source node, or by a destination node, or automatically, or following a request by a user. The method of the invention consists of inserting this new transmission or transmissions which may be accepted taking into account the capacities of the network and the active transmissions, i.e. the current transmissions, but also optionally any transmission requests that have not been honoured and which remain waiting.

It should be noted that, when a transmission request relates to a transmission between a source node and a plurality of receivers, for example in the context of a multicast transmission, it is considered that the transmission request relates to a plurality of unicast transmissions between the source node and each of the receiving nodes. Each unicast transmission is then verified. In one embodiment, each unicast transmission may be accepted and implemented independently of the other unicast transmissions in the plurality of unicast transmissions. In another embodiment, when at least one unicast transmission in the plurality of unicast transmissions is not accepted, the multicast transmission is entirely refused, so that no unicast transmission is implemented.

II. With the second, it is a case of the cessation of an active transmission. This end of transmission releases resources on the network.

The following two types of event cause changes in the topology of the network:

III. The first is a modification of existing links. The network being mobile, the nodes move and the capacities of the links connecting these nodes together change over time. The bandwidth of some nodes may for example decrease, or disappear, which may cause a rerouting of certain active transmissions on other links, or the stoppage of certain transmissions. Conversely, the bandwidth of certain links may increase.

IV. The second is the establishment of new links. This event covers the arrival of a new node in the network. This new node causes the creation of new links and the introduction of new traffic associated with the new node, which changes the capacities of the network. Transmissions, up till then put in a waiting queue, may then be honoured because of these new capacities.

We shall see hereinafter that the distinction between events not causing any change to the topology of the network and nodes causing such a change make it possible to simplify the solving of the problem of managing transmission requests.

In another embodiment, the transmission request management algorithm may be launched periodically, for example in order following changes in the topology of the network or current transmissions. The transmission request management algorithm may for example be launched following an algorithm for updating the routing tables of the nodes in the network, used by a routing protocol, for example of the LSR type.

The transmission request management algorithm therefore continues with the identification of the type of the new event received by the master node. During a step 12, the master node determines whether the event is of type I. If so, the algorithm continues with a step 13 of checking the compatibility of a new transmission request with the capacities of the network, which are detailed hereinafter in relation to FIGS. 2 to 4.

If not, the master node determines whether the event is of type II during a step 14. If such is the case, this step is followed by a step 15 of updating the transmissions that will be detailed hereinafter in relation to FIG. 5.

If not, the master node determines whether the event is of type III during a step 16. If such is the case, the algorithm continues with a step 17 of checking the compatibility of the existing transmissions with the capacities of the network that will be detailed in relation to FIG. 6.

If not, the master node determines whether the event is of type IV during a step 18. If such is the case, the algorithm continues with a step 19 of updating the transmissions that will be detailed hereinafter once again in relation to FIG. 6.

If the event in question does not correspond to a known event, no change is made to the current transmissions. Steps 13, 15, 17 and 19 are followed by a step 21 in which the master node authorises the transmissions corresponding to a set of transmission requests selected during steps 13, 15, 17 and 19 to be implemented. If no subset has been adopted, no transmission is implemented.

Figure 4:
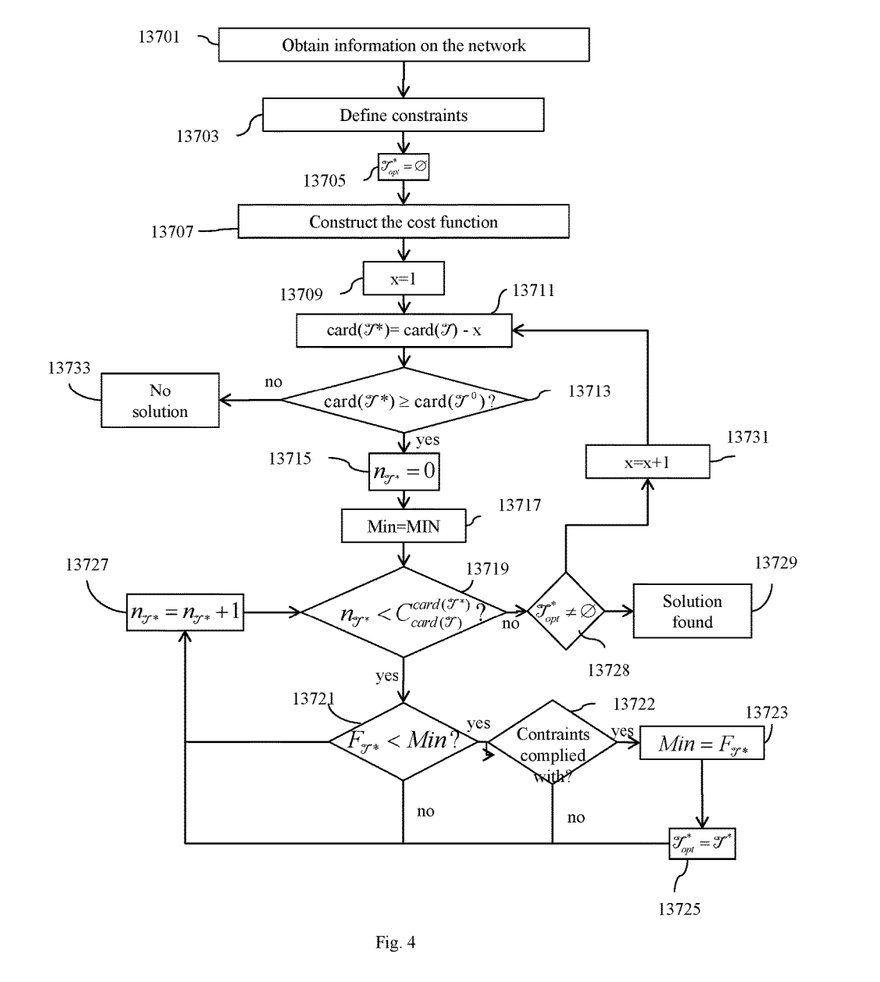
FIG. 4 shows an algorithm for constrained optimisation of the quantity of active transmissions on the ad-hoc mobile network at a given instant.

In one embodiment, if the event in question does not correspond to a known event, the master node implements an algorithm for the constrained optimisation of the quantity of active transmissions on the ad-hoc mobile network described in relation to FIG. 4.

Figure 2:
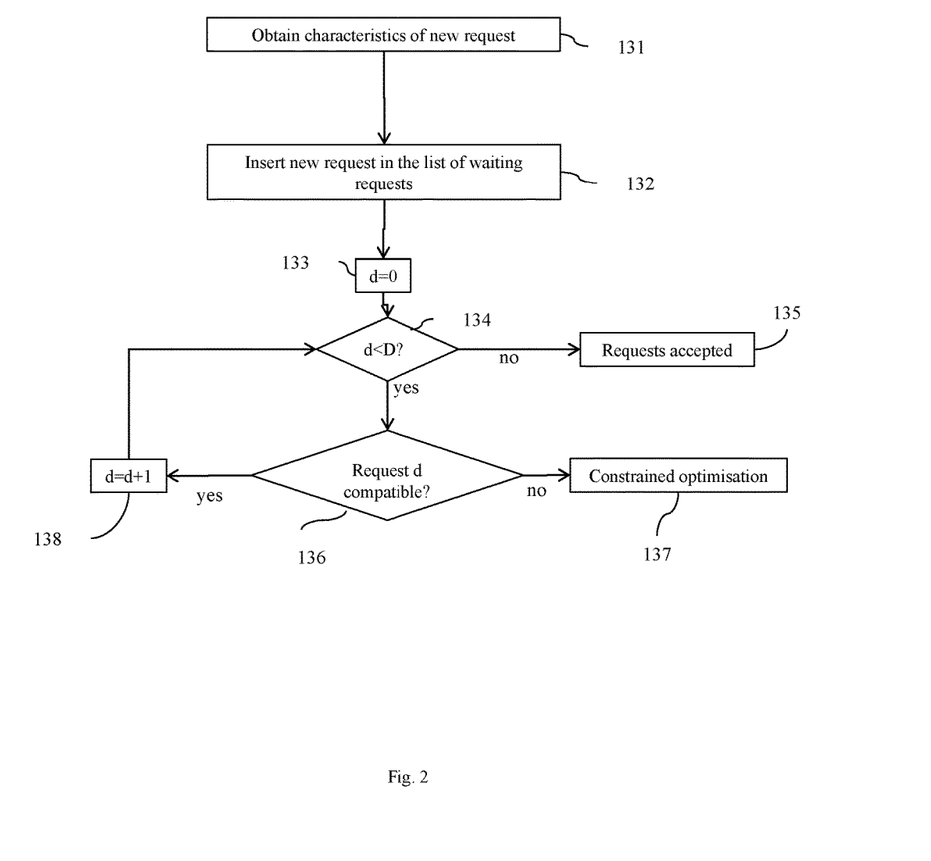
FIG. 2 shows an algorithm for checking the compatibility of traffic caused by a transmission request with characteristics of the ad-hoc mobile network.

A detailed implementation of step 13 in FIG. 1 is described in FIG. 2. During a step 131, characteristics of a new transmission request are obtained by the master node, for example in the form of a request. The characteristics contained in the request comprise for example an identification of the source node of the transmission requested, an identification of one or more destinations of this transmission, a transmission rate of the traffic caused by this transmission, a latency required by this transmission and a criticality level of this transmission. This new request is inserted in a list of waiting requests during a step 132. This list may be empty or already contain one or more waiting transmission requests.

A variable D is used for representing the number of waiting transmission requests present in the list. During a step 133, a variable d is initialised to the value "0". This variable d is used for running through the list of waiting requests. During a step 134, the variable d is compared with the variable D in order to determine whether all the waiting transmission requests have been considered. If there are still requests to be considered, during a step 136 the master node tests the compatibility of the traffic caused by the request of index d with the capacities of the network and in particular with the capacities of the links involved in the transmission request adopted for the traffic caused by the request of index d. Step 136 will be detailed in relation to FIG. 3.

If the traffic associated with the request of index d is compatible with the transmission path adopted for the transmission of this traffic, the master node performs a step 138 during which the variable d is incremented by one unit in order to pass to the following transmission request.

If during step 134 the variable d has reached the value of the variable D, all the waiting transmission requests are accepted by the master node during a step 135. The list of waiting requests is then emptied. In this case, the current transmissions can continue and the transmissions corresponding to the waiting requests are implemented.

To do this, the reservation of the links involved in the transmission of the traffic, for all the requests accepted, can be provided by the RSVP protocol ("Resource reSerVation Protocol").

Competing access to the medium of the various transmissions can be provided by conventional medium access control layer methods of the OSI ("open systems interconnection") model, such as the following methods:

CSMA/CA: "Carrier Sense Multiple Access/Collision Avoidance"
CSMA/CD: "Carrier Sense Multiple Access/Collision Detection"
CDMA: "Code Division Multiple Access"
TDMA: "Time Division Multiple Access"
FTDMA (or OFDMA): "Frequency Time Division Multiple Access" (or "Orthogonal Frequency Division Multiple Access").

On the other hand, if, during step 136, the master node determines that one of the traffics caused by one of the waiting requests is incompatible with a transmission on a transmission path adopted for effecting the transmission of this traffic, the running through of the list is stopped and a constrained optimisation, which will be detailed later in relation to FIG. 4, is launched in order to determine which transmissions must be accepted.

It can be noted that steps 134, 135, 136 and 138 of the algorithm in FIG. 2 constitute a simplified procedure for determining transmission requests to be authorised. This simplified procedure makes it possible to avoid the use of constrained optimisation, which is a complex procedure having a high computing cost. We shall see hereinafter that, when the topology of the network is modified, the constrained optimisation step 137 is implemented directly without using the simplified procedure.

Figure 3:
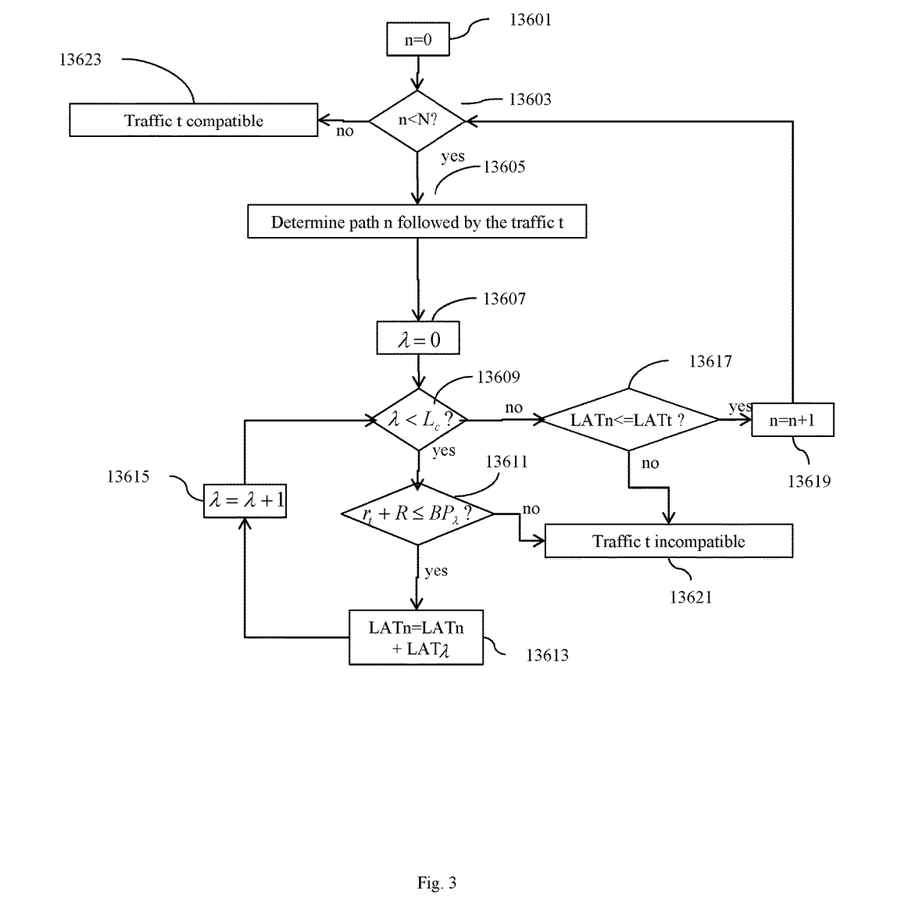
FIG. 3 shows an algorithm for testing the compatibility of traffic caused by a transmission request with characteristics of the network and taking into account traffic already existing on the ad-hoc mobile network.

FIG. 3 gives a detailed representation of an algorithm implementing step 136. As seen above, each transmission request is associated with information representing a source node and information representing at least one destination node. Using an LSR protocol, it is possible to know the best transmission path connecting the source node to a destination node. This best transmission path is the transmission path adopted for any transmission between a source node and a destination node. This protocol makes it possible to periodically update the topology of the network.

The algorithm in FIG. 3 starts with the initialisation, during a step 13601, of a variable n to the value "0". This variable serves to run through a set of N transmission paths that a given traffic must follow. If a traffic is intended for a single destination node, as is the case in unicast, a single transmission path is considered (N=1). If a traffic is intended for N (N>1) destination nodes, as is the case in multicast, N transmission paths are considered. During a step 13603, the master node determines whether all the transmission paths taken by a traffic t have been envisaged. If such is not the case, the characteristics of the transmission path of index n are determined by the master node during a step 13605. A transmission path is associated with nodes that it passes through and with links connecting the nodes passed through. It is assumed that the capacities of each link are known during this step through an extension of the LSR protocol. Considering that a transmission path comprises $L_c$ ($L_c \geq 1$) links, each link (identified below by means of a variable $\lambda$) constituting this transmission path is associated with a bandwidth $BP_\lambda$.

In order to run through all the links constituting the transmission path of index n, the variable $\lambda$ representing links to be run through is initialised to the value "0" by the master node during a step 13607. The master node next compares the variable $\lambda$ with $L_c$ in order to determine whether all the links have been taken into account during a step 13609. If links are still to be taken into account, a step 13611 follows step 13609. During step 13611, a sum $(r_t + R_\lambda)$ of a rate $r_t$ associated with the traffic t and a rate $R_\lambda$ of the competing traffic existing on the link of index $\lambda$ is compared with the bandwidth available on the link of index $\lambda$, $BP_\lambda$, by the master node. The competing traffics are here traffics using the link of index $\lambda$ generated by active transmissions or corresponding to transmission requests of index d already considered by the algorithm in FIG. 2. If the sum is greater than the available bandwidth, the traffic t is considered to be incompatible with the capacities of the network. Otherwise the algorithm continues with the calculation of the transmission latency of the traffic t on the transmission path of index n (LATn) during a step 13613. It is assumed here that the latency of each link $LAT_\lambda$ is known during this step through an extension of the LSR protocol. The latency of the transmission path of index n is the sum of the latencies of all the links included in the transmission path of index n. The variable $\lambda$ is next incremented by one unit by the master node in order to pass to the following link during a step 13615.

If during step 13609 the master node finds that all the links constituting the transmission path of index n have been taken into account, the master node compares the transmission latency LATn of the traffic t on the transmission path of index n with the latency LATt for the traffic t. If the latency calculated during step 13613 is greater than the latency required, the traffic t is considered to be incompatible with the capacities of the network. Otherwise, during a step 13619, the master node increments the variable n by one unit in order to pass to the following transmission path.

If during step 13603 all the transmission paths adopted for the transmission of the traffic t have been taken into account without the traffic t being considered to be incompatible with the capacities of the network, the traffic t is declared to be compatible with the current capacities of the network during a step 13623.

Returning to FIG. 2, if at least one traffic relating to a waiting request in the list of waiting requests is considered to be incompatible with the characteristics of the network, an optimisation of the number of active transmissions is implemented during step 137. This optimisation is a constrained optimisation.

Assume a set of transmission requests. It is assumed initially that all the transmission requests have equal criticality levels. Consequently the criticality level is here not taken into account for sequencing the transmission requests with each other. Each transmission request is associated with a traffic t belonging to a set of traffics $\mathcal{T}$ of cardinal card($\mathcal{T}$). Assume all the subsets of traffics $\mathcal{T}'$ (of cardinal card($\mathcal{T}'$)) of $\mathcal{T}$ such that card($\mathcal{T}'$)$\leq$card($\mathcal{T}$). The objective of the optimisation is therefore to find a subset of traffic $\mathcal{T}^*$ maximising card($\mathcal{T}^*$), and therefore maximising the quantity of active transmissions at a given instant.

As mentioned above, it is assumed here, to simplify, that a multicast transmission is a set of unicast transmissions. Let $\mathcal{G}_t$ be all the possible transmission paths in the meshed network that can be used for a traffic t. A routing protocol makes it possible to identify in this network the path in the set $\mathcal{G}_t$ minimising a cost function. Generally this transmission path corresponds to the shortest transmission path, i.e. the transmission path minimising the number of nodes passed through.

The optimisation algorithm may take two forms:
In the first form, it is considered that a routing protocol (potentially integrated in LSR) gives the best transmission path for each traffic in question. The transmission paths thus form part of the input data of the optimisation algorithm and are therefore not called into question during optimisation. Only the choice of traffics to be authorised is the data to be optimised for maximising the number of active transmissions.
In the second form, the transmission paths themselves form part of the data to be optimised. Then the quantity of active transmissions and the transmission paths used by the traffic caused by each active transmission are then optimised jointly.

In the first form, each traffic t in question is associated with a transmission path determined by the routing protocol. Let $c_t \in \mathcal{G}_t$ be the transmission path associated with the traffic t. This transmission path is associated with a set of links passed through $\mathcal{L}_t$, each link of index λ of $\mathcal{L}_t$ belonging to a set $\mathcal{L}$ composed of links constituting the network. Moreover, each traffic is associated with a transmission rate $r_t$ and a required latency $LAT_t$.

Each link of index λ of the network is associated with a Boolean variable $\delta_\lambda^t$ indicating whether the link is used ($\delta_\lambda^t=1$) by the traffic t or not ($\delta_\lambda^t=0$). In addition, each link is associated with a maximum bandwidth $BP_\lambda$ and a latency $LAT_\lambda$.

Constrained optimisation requires an evaluation of a cost associated with each solution found. Here the cost $F_{\mathcal{T}^*}$ of a solution corresponding to a subset of traffic $\mathcal{T}$ is a sum of costs $f_t$ respectively associated with the transmission paths $c_t$ used for the traffic t.

In the network field, it is conventional to use the quantity of nodes, also referred to as the number of hops, involved in a transmission path to represent the cost of a transmission path. It is considered in fact that, by minimising the number of nodes involved in a transmission path, the risk of the traffic passing over this transmission path disturbing the network as a whole is minimised. Minimising the number of nodes through which a transmission path passes amounts to minimising the number of links used by this transmission path. A cost function representing a number of links is therefore used.

The cost function $f_t$ associated with a transmission path $c_t$ is then given by:

$$f_t = \sum_{\lambda \in \mathcal{L}_t} \delta_\lambda^t$$

For a set of traffic $t \in \mathcal{T}$, the total cost of the transmissions on their respective transmission paths is given by:

$$F_{\mathcal{T}^*} = \sum_{t \in \mathcal{T}^*} \sum_{\lambda \in \mathcal{L}_t} \delta_\lambda^t$$

The network used involves several types of constraint generally comprising a transmission rate constraint and a latency constraint. A transmission rate constraint C1 is such that the total rate of the traffic passing over a given link must not exceed the bandwidth allowable on this link. This constraint is expressed for example as follows:

$$\forall \lambda \in \mathcal{L}, \sum_{t \in \mathcal{T}^*} \delta_\lambda^t \cdot r_t \leq BP_\lambda \tag{C1}$$

A latency constraint C2 is such that the latency on the transmission path adopted for a traffic t is compatible with a required latency. This constraint is for example expressed as follows:

$$\forall t \in \mathcal{T}^*, \sum_{\lambda \in \mathcal{L}_t} \delta_\lambda^t \cdot LAT_\lambda \leq LAT_t \tag{C2}$$

For a given number of authorised transmission requests, the constrained optimisation algorithm seeks the subset of traffic $\mathcal{T}$ of maximum size minimising the cost function $F_{\mathcal{T}^*}$ while remaining compatible with the capacities of the network. A third type of constraint is therefore a constraint C3 of size of an optimum traffic subset $\mathcal{T}_{opt}^*$.

$$\forall \mathcal{T}, \text{card}(\mathcal{T}_{opt}^*) \geq \text{card}(\mathcal{T}) \tag{C3}$$

The variable to be maximised is the size of the traffic subset $\mathcal{T}$ (i.e. the cardinal of the traffic subset $\mathcal{T}$). If, for this maximum size, several solutions exist, the algorithm chooses the solution minimising the cost function. The optimisation can therefore be summarised as follows:

$$\mathcal{T}_{opt}^* = \min_{\mathcal{T}^* \in \mathcal{T}} F_{\mathcal{T}^*} \tag{C1}$$

under $$\forall \lambda \in \mathcal{L}, \sum_{t \in \mathcal{T}^*} \delta_\lambda^t \cdot r_t \leq BP_\lambda,$$

$$\forall t \in \mathcal{T}^*, \sum_{\lambda \in \mathcal{L}_t} \delta_\lambda^t \cdot LAT_\lambda \leq LAT_t, \tag{C2}$$

$$\forall \mathcal{T}^*, \text{card}(\mathcal{T}_{opt}^*) \geq \text{card}(\mathcal{T}^*), \tag{C3}$$

where $\mathcal{T}_{opt}^*$ is the optimum traffic subset, min(x) takes the minimum of a variable x, card($\mathcal{E}$) gives the cardinal of a set $\mathcal{E}$. Up until then, we have considered that all the transmissions were of an equal criticality level. In reality, some transmissions are more critical than others, and the most critical transmissions are favoured. The criticality level is therefore used for sequencing the transmission request with each other. The transmission requests with the highest criticality levels must preferably be maintained in the event of an overload on the network. A critical transmission request is for example a transmission request containing information of high importance, or a request transmitting urgent information the interest of which depends on the date which it is received.

The criticality level of a transmission in the preceding optimisation can be taken into account by the addition of a constraint:

$$\forall t_{opt} \in \mathcal{T}^*_{opt}, \forall t \in \{\mathcal{T}^* - \mathcal{T}^*_{opt}\}, \forall p_t, \forall p_{t_{opt}} p_{t_{opt}} \geq p_t \quad (C4)$$

where $\{\mathcal{T}^* - \mathcal{T}^*_{opt}\}$ is all the traffic subsets in the traffic set $\mathcal{T}^*$ not comprising the optimum traffic subset $\mathcal{T}^*_{opt}$, $p_{t_{opt}}$ is a criticality level associated with a transmission included in the optimum traffic subset $\mathcal{T}^*_{opt}$, and $p_t$ is a criticality level associated with a transmission included in $\{\mathcal{T}^* - \mathcal{T}^*_{opt}\}$. This constraint prevents a transmission belonging to the optimum set having a criticality level lower than a transmission that has not been selected in the optimum set In one embodiment, other constraints can be envisaged such as for example a constraint dependent on margins, a constraint dependent on a tolerance to faults by secondary routing, a constraint dependent on a maximum traffic interruption time, a constraint dependent on a network access time, etc.

FIG. 4 corresponds to a step 137 illustrated in FIG. 2 and gives an example of optimisation of the set of authorised traffic. The optimisation begins with a step 13701 during which the characteristics of the network are obtained by the master node, in particular the number of nodes in the network, the bandwidth and the latency of links in the network. In addition, during this step, the master node obtains all the transmission requests comprising the accepted requests corresponding to current active transmissions and the waiting requests not accepted.

The optimisation continues with a definition of constraints to be complied with during optimisation during a step 13703. In the case of traffics with equal criticality levels, only constraints C1, C2 and C3 are to be complied with. In the case of unequal criticality levels, the constraint C4 is to be added.

During a step 13705, the optimum traffic subset $\mathcal{T}^*_{opt}$ associated with the accepted transmission requests is initialised to the empty set. This step is followed, during a step 13707, by the construction of the cost function $F_{\mathcal{T}^*}$ described above and, during a step 13709, by the initialisation of a variable x to the value "1". The variable x is used to seek the cardinal of the optimum subset $\mathcal{T}^*$. By taking x=1, it is assumed that, following the algorithm in FIG. 2, the master node has been able to deduce that not all the transmission requests can be honoured and that at least one transmission request must be refused. It can be noted that, if the optimisation had been launched without passing through the simplified procedure for determining transmission requests to be authorised of steps 134, 135, 136 and 138, the variable x would have begun at 0 in order to check whether all the transmissions (current or waiting) can be accepted.

During a step 13711, the master node calculates the cardinal of the traffic subset $\mathcal{T}^*$ in this iteration (card($\mathcal{T}^*$)=card($\mathcal{T}^*$)−x), and then the master node checks that this new cardinal is indeed equal to the cardinal of a traffic subset $\mathcal{T}^{*0}$ corresponding to transmission requests with a high criticality level that must absolutely be accepted.

If a cardinal value of the traffic subset $\mathcal{T}^*$ lower than the cardinal of the traffic subset $\mathcal{T}^{*0}$ is obtained, this means that no solution compatible with the constraints has been able to be found. In this case, the algorithm ends with a step 13733. During step 13733, a notification is sent to each node so that each operator associated with one of nodes is informed of the situation so as for example to alert each operator that the communications on the network risk being degraded. In one embodiment, during step 13733, the subset of authorised traffics is the traffic subset $\mathcal{T}^{*0}$.

If the cardinal of the traffic subset $\mathcal{T}^*$ is greater than or equal to the cardinal of the subset $\mathcal{T}^{*0}$, a variable $n\mathcal{T}^*$ is initialised to the value "0". This variable is used to run through all the possible traffic subsets $\mathcal{T}^*$ of size (card($\mathcal{T}^*$)) of the traffic set $\mathcal{T}^*$.

The optimisation continues with the initialisation of a variable Min to a value MIN. The master node takes a value MIN sufficiently great to ensure that any value of the variable Min calculated in the algorithm is less than the value MIN. By way of example, we propose a value MIN calculated from the formula for computing the cost $F_{\mathcal{T}^*}$ by fixing $\delta_\lambda^t$ at the value "1". The value "1" is added to the result of this calculation in order to ensure that no cost $F_{\mathcal{T}^*}$ can reach this value:

$$\text{MIN} = \left(\sum_{t \in \mathcal{T}} \sum_{\lambda \in \mathcal{L}_t} 1\right) + 1$$

During a step 13719, the master node checks whether all the traffic subsets $\mathcal{T}$ of size card ($\mathcal{T}$) of the traffic set $\mathcal{T}^*$ have been taken into account. The total number of possible traffic subsets $\mathcal{T}$ of the traffic set $\mathcal{T}^*$ given by the binomial coefficient $C_{\text{card}(\mathcal{T})}^{\text{card}(\mathcal{T}^*)}$.

If traffic subsets remain to be taken into account, the value of the cost of the current traffic subset $\mathcal{T}$ is calculated and compared with the variable Min during a step 13721. If the cost $F_{\mathcal{T}^*}$ of the current traffic subset $\mathcal{T}$ is less than the value of the variable Min, this step is followed by a step 13722 during which the compatibility of the traffic subset $\mathcal{T}$ in question with all the constraints is checked. If such is the case, the variable Min takes the current value of the cost function $\mathcal{T}^*_{opt}$ during a step 13723 and the optimum traffic subset $\mathcal{T}^*_{opt}$ takes the value of the traffic subset $\mathcal{T}$ during a step 13725. In any cases, steps 13721 and 13722 are followed by a step 13727 that makes it possible to increment the variable $n\mathcal{T}^*$ by one unit.

If all the traffic subsets $\mathcal{T}$ in the traffic set $\mathcal{T}^*$ have been run through without finding at least one subset compatible with the constraints, during a step 13728, the master node decreases the cardinal of the traffic subset $\mathcal{T}$ by increasing the variable x by one unit during a step 13731 and then returning to step 13711. On the other hand, if at least one solution has been found, the algorithm ends during a step 13729 and the optimum traffic subset $\mathcal{T}^*$ calculated during step 13725 is kept. This subset indicates all the transmission requests to be accepted.

In a particular implementation of the optimisation of all the authorised transmissions of FIG. 4, a supplementary constraint may be added in step 13722. The objective of this supplementary constraint is to minimise the disturbances caused by a change in the network. To do this, the master node attempts to preserve the active transmission requests under way. Thus, if the conditions on the network so permit, the current transmissions may continue to their end. To do this, a particular implementation of the algorithm in FIG. 4 consists of allocating a high criticality level to the active transmission requests. Thus the master node fixes the criticality level p of the current active transmission requests as follows:

$$P_1 < p < P_2$$

where $P_1$ is the maximum criticality level among the transmission requests that do not absolutely have to be honoured, and $P_2$ is the minimum criticality level of the transmission requests that must absolutely be honoured.

It may be noted that a suboptimum version of the constraint optimisation described in FIG. 4 may be used. In this solution, the optimisation of all the authorised traffics in FIG. 4 may be stopped at any time by the master node as soon as at least one traffic subset $\mathcal{T}$ compatible with the constraints is found. This stoppage may be caused by a user or following the expiry of a predefined time for maximum execution of the constrained optimisation procedure. This solution therefore has the advantage of reducing the computing cost of the optimisation compared with complete optimisation. The solution obtained at the time of the stoppage of the optimisation maximises the quantity of active transmissions on the network at a given instant, but is not necessarily the solution minimising the cost function $F_{\mathcal{T}^*}$.

In one embodiment, it is considered that no routing protocol has made it possible to associate each traffic with a transmission path. In this embodiment, the master node optimises jointly the amount of active transmissions and the transmission paths used by the traffic associated with each transmission. In one embodiment, step 13721 is modified. During the modified step 13721, an optimisation is implemented so as to associate each traffic included in the traffic subset $F_{\mathcal{T}^*}$ with a transmission path minimising a cost function, among the possible transmission paths for this traffic. The cost function $F_{\mathcal{T}^*}$, is calculated once each traffic in the traffic subset $F_{\mathcal{T}^*}$ is associated with a transmission path of minimum cost.

The algorithm described in relation to FIG. 4 is almost exhaustive since it examines almost all the possible solutions and stops only when a solution compatible with the constraints is found or when no solution other than the subset $\mathcal{T}^{*0}$ is found. This almost exhaustive algorithm can be envisaged as long as the number of transmissions envisaged is low. When the number of transmission requests is high or when the optimisation relates to the conjoint optimisation of the quantity of active transmissions and transmissions followed by the traffic associated with each transmission, this algorithm may have a high computing cost. In one embodiment, the algorithm described in relation to FIG. 4 is advantageously replaced by a separation and evaluation algorithm also known by the English term branch and bound. The branch and bound algorithm is a generic approach for solving optimisation problems, and more particularly discrete optimisation. One particularity of this approach is that it avoids exhaustively analysing all the possible solutions to a problem, while making it possible to find an optimum solution.

Figure 5:
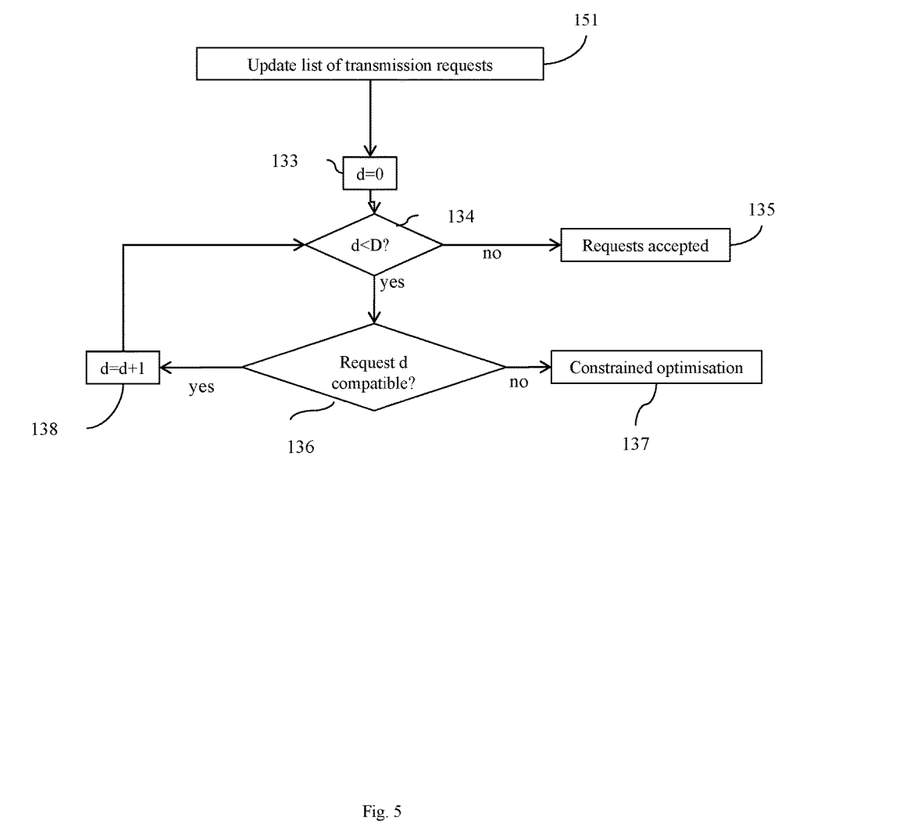
FIG. 5 shows an algorithm for verifying the compatibility of existing transmissions with a change in the topology of the ad-hoc mobile network.

Returning to FIG. 1, step 15 of updating the transmission is described in detail in relation to FIG. 5. FIG. 5 resumes FIG. 2 and keeps steps 133 to 138. However, steps 131 and 132 are replaced by a single step 151 of updating the list of transmission requests. During this step, the list of waiting transmission requests remains unchanged. On the other hand, the transmission or transmissions that have ended are removed from the list of active transmissions. The remainder of the algorithm in FIG. 5 is in every respect identical to the remainder of the algorithm in FIG. 2.

Figure 6:
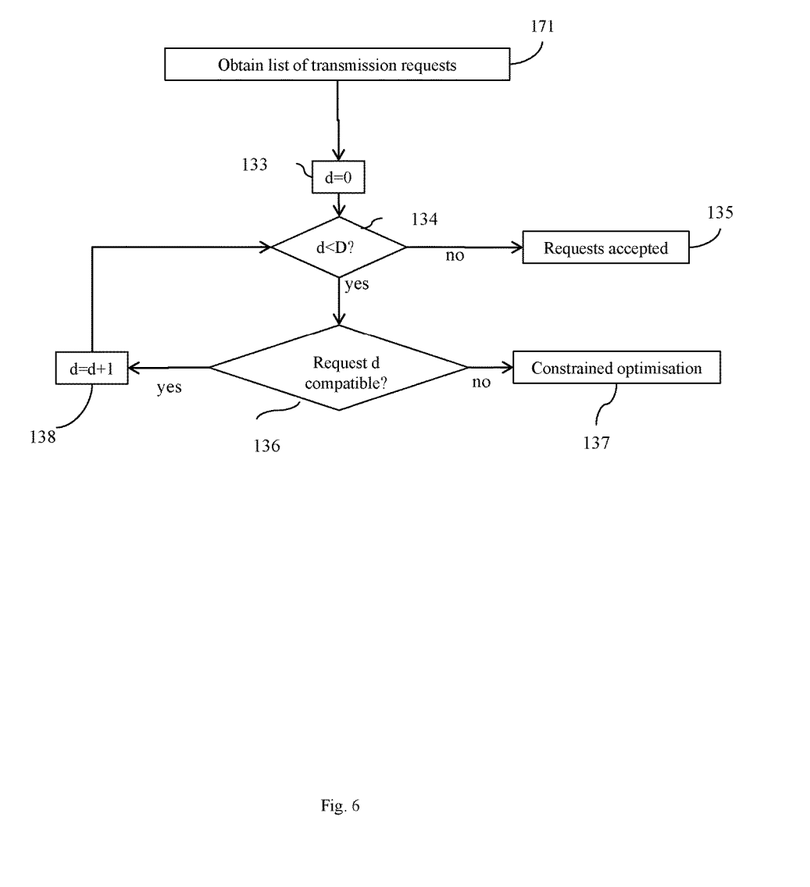
FIG. 6 shows an algorithm for updating transmissions on the ad-hoc mobile network.

FIG. 6 shows the modifications made to the algorithm in FIG. 2 for managing the modifications of existing links corresponding to step 17 in FIG. 1. Steps 131 and 132 are replaced by a step 171 of obtaining the combined list of active transmissions and waiting transmission requests. The remainder of the algorithm is in every respect identical to the algorithm in FIG. 2. The modifications of links appear during step 13701 in FIG. 4 in the form of modifications of characteristics of certain links, or even changes to the list $\mathcal{T}^*$ of links available on the network. In the latter case, for example, certain nodes in the network are out of range of other nodes in the network. In this case, the links leading to these nodes may be deleted from the list $\mathcal{T}^*$. In another embodiment, the master node may give to these links particular characteristics such as a zero bandwidth $BP_\lambda$ and an infinite latency $LAT_\lambda$. This implementation makes it possible to manage more easily the nodes that are temporarily out of range of the other nodes in the network. This is because, in this case, the links leading to these nodes always appear in the list $\mathcal{T}^*$ of existing links. However, when nodes are out of range, the characteristics of the links that are associated with them are such that these links are never selected to carry out a transmission.

It should be noted that step 17 of checking the compatibility of the existing transmissions with the new characteristics of the network cannot apply the simplified procedure for determining the transmission requests to be authorised of steps 134, 135, 136 and 138 in FIG. 2. This is because, in this case, the topology of the network has changed. But, applying steps 134, 135, 136 and 138 is possible only when the topology is stable. At least some of the transmission paths therefore have to be revised. In this case, step 171 is followed directly by the constrained optimisation step 137.

The appearance of one or more new nodes in the network corresponding to step 19 in FIG. 1 is dealt with by the algorithm in FIG. 6. The taking into account of the new links appears during step 13701 in FIG. 4. In this case, the new links are added to the list $\mathcal{T}$ of the links available on the network. The remainder of the implementation of step 19 is in every respect identical to the implementation of step 17.

Figure 7:
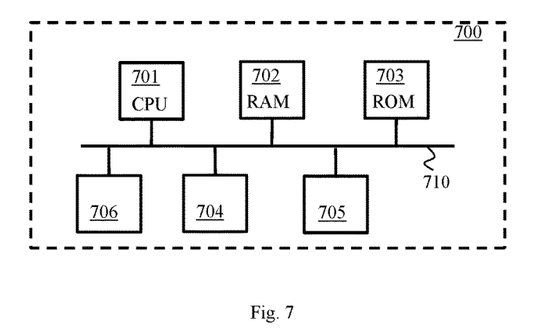
FIG. 7 illustrates schematically an example of hardware architecture of a device able to use a node of the network according to the present invention.

FIG. 7 illustrates schematically an example of hardware architecture of a device 700 able to implement a node in the network and in particular the master node according to the present invention. The device 700 then comprises, connected by a communication bus 710: a processor or CPU (central processing unit) 701; a random access memory (RAM) 702; a read only memory (ROM) 703; a storage unit 704 or a storage medium reader, such as an SD (secure digital) card reader or a hard disk HDD (hard disk drive); an optronic sensor 706 capable of acquiring image, video or audio data or other information, and a set of interfaces 705 for receiving data issuing from one or more other nodes and supplying data issuing from the optronic sensor to other nodes, for example by means of a communication network such as the ad-hoc mobile network described in relation to FIG. 8.

The processor 701 is capable of executing instructions loaded in the RAM 702 from the ROM 703, from an external memory (not shown), from a storage medium, or from a communication network (not shown). When the device 700 is powered up, the processor 701 is capable of reading instructions from the RAM 702 and executing them. These instructions form a computer program causing the implementation, by the processor 701, of all or some of the algorithms and steps described above.

All or some of the algorithms and steps described above can thus be implemented in software form by the execution of a set of instructions by a programmable machine, such as a DSP (digital signal processor) or a microcontroller, or be implement in hardware form by a machine or a dedicated component such as an FPGA (field-programmable gate array) or a ASIC (application-specific integrated circuit). This means that only some of the modules can be implemented in software form while the rest of said modules can be implemented in hardware form.

The invention claimed is:

1. A method for maximising a quantity of authorised transmission requests among a set of transmission requests in a mobile wireless network comprising a plurality of mobile nodes connected by links, each link being associated with capacities comprising a bandwidth and a latency, each transmission having to take place on a transmission path and being associated with characteristics comprising a maximum allowable transmission rate and latency, wherein said method is implemented by a master node and is activated on reception by the master node of an event belonging to a predefined set of events, the predefined set of events comprising a first type of event involving a change in topology of the network, and comprises:
obtaining a set of transmission requests, each transmission request requesting a transmission of data between a first node and at least one second node and having been received by the master node;
if the event is of the first type, implementing a constrained optimisation procedure comprising:
defining constraints comprising transmission rate and latency constraints according to the capacities of each link involved in each transmission path adopted for each transmission request in the set of transmission requests;
defining at least one subset of the set of transmission requests;
associating each defined subset with a cost function, the cost function associated with a subset taking into account the transmission paths adopted for the respective transmission requests included in the subset;
determining a subset of maximum-cardinality compatible with the defined constraints and minimising the cost function; and,
for each transmission request of the determined subset, sending an authorization to the first node to authorize said first node to transmit data to each second node.

2. The method according to claim 1, wherein the predefined set comprises a second type of event not involving any modification to the topology of the network, the determination of the subset of maximum-cardinality compatible with the constraints defined in the context of an event of the second type uses a simplified procedure for determining the transmission requests to be authorised, the implementation of the constrained optimisation procedure being dependent on the result of the simplified procedure for determining the transmission requests to be authorised.

3. The method according to claim 1, wherein the characteristics of a transmission request also comprise a criticality level making it possible to sequence the processing of the transmission requests with respect to one another, the respective criticality levels of the transmission requests of a given subset being taken into account by the method in the form of a supplementary constraint making it possible to ensure that the subset determined comprises the transmission requests of all the transmission requests associated with the highest criticality levels.

4. The method according to claim 1, wherein each transmission path adopted for a transmission request belonging to a given subset of transmission requests is associated with a cost dependent on a quantity of nodes through which the transmission path passes, the cost function of a given subset of transmission requests being the sum of the costs associated with the transmission paths adopted for each transmission request included in the given subset of transmission requests.

5. The method according to claim 1, wherein the constrained optimisation procedure comprises a search for optimum transmission paths for each transmission request.

6. The method according to claim 1, wherein all the transmission requests comprise authorised requests associated with current transmissions and waiting requests.

7. The method according to claim 1, wherein each node in the network comprises an optronic sensor capable of acquiring information comprising data of the image and video type, the transmissions used by the method being transmissions of this information.

8. The method according to claim 1, wherein the first type of event corresponds to events relating to:
a change to at least one characteristic of a link in the network, or
an appearance of a new node in the network.

9. The method according to claim 2, wherein the predefined set comprises a second type of event that corresponds to events relating to:
reception of a new transmission demand from a source node or from a destination node without change to the topology of the network, or
an end of an active transmission without change to the topology of the network.

10. Method according to claim 1, wherein the subset determined is the subset of maximum-cardinality compatible with all the constraints defined and minimising the cost function at a moment of stopping the constrained optimisation procedure.

11. A communication device able to maximise a quantity of authorised transmission requests among a set of transmission requests in a mobile wireless network comprising a plurality of communication devices connected by links, each link being associated with capacities comprising a bandwidth and a latency, each transmission having to take place on a transmission path and being associated with characteristics comprising a maximum allowable rate and latency, wherein the communication device comprises:
electronic circuitry adapted for:
receiving events;
determining a type of event received in a predefined set of events, the predefined set of events comprising a first type of event involving a change to the topology of the network;

obtaining a set of transmission requests, each transmission request requesting a transmission of data between a first node and at least one second node and corresponding to a transmission request received by the communication device;

defining constraints comprising rate and latency constraints according to the capacities of each link involved in each transmission path adopted for each transmission request in the set of transmission requests obtained, defining subsets of the set of transmission requests obtained, associating each subset defined with a cost function, the cost function associated with a subset taking into account the transmission paths adopted for the respective transmission requests included in the subset, determining, among the subsets defined, a subset of maximum-cardinality compatible with the constraints defined and minimising the associated cost function, the subset determined representing the transmission requests to be authorised; and for each transmission request of the determined subset, sending an authorization to the first node to authorize said first node to transmit data to each second node.

12. A communication system comprising a plurality of mobile communication devices communicating in accordance with a wireless communication mode, and comprising a communication device according to claim 11.

* * * * *